July 26, 1955 — A. H. HEINRICH — 2,714,025
ROTARY SEAL
Filed Oct. 24, 1952 — 2 Sheets-Sheet 1

INVENTOR.
August H. Heinrich
BY Bates, Teare & McBean
Attorneys

July 26, 1955  A. H. HEINRICH  2,714,025
ROTARY SEAL
Filed Oct. 24, 1952  2 Sheets-Sheet 2

INVENTOR.
August H. Heinrich
BY Bates, Teare & McBean
Attorneys

# United States Patent Office 2,714,025
Patented July 26, 1955

2,714,025

ROTARY SEAL

August H. Heinrich, Euclid, Ohio, assignor to Metal Seal & Products, Inc., Cleveland, Ohio, a corporation of Ohio Application October 24, 1952, Serial No. 316,701

6 Claims. (Cl. 286—11.15)

This invention relates to fluid seals generally and more particularly to improvements in fluid seals for a rotating shaft.

Rotating shafts which drive or are driven by some member enclosed in a fluid housing present inherent difficulties in sealing the fluid in the housing and preventing its escape along the shaft. Relative motion of the shaft presents structural problems in the development of such a seal because of the displacement forces and wear of cooperating parts. The principal object of this invention is to provide an improved rotary seal of the type which is most effective when the shaft is rotating.

Briefly, in accordance with this invention, there is provided a stationary abutment for a relatively movable sealing assembly, which assembly, under the influence of a resiliently flexible operating member, coacts axially along the shaft against the abutment and into wedging relation against a driving member on the shaft to provide a fluid-tight seal thereon. The axial coaction of the relatively movable sealing members also maintains a sealing and bearing contact with the abutment to prevent leakage of fluid therebetween. A modified form of assembly utilizes additional contact bearing surfaces adapted to coact axially under the influence of the operating member in the assembly to establish and maintain a fluid seal along the shaft.

In the drawings, Fig. 1 illustrates in partial cross section a preferred embodiment of the sealing assembly mounted along a shaft extending from a housing wall.

Figure 1:
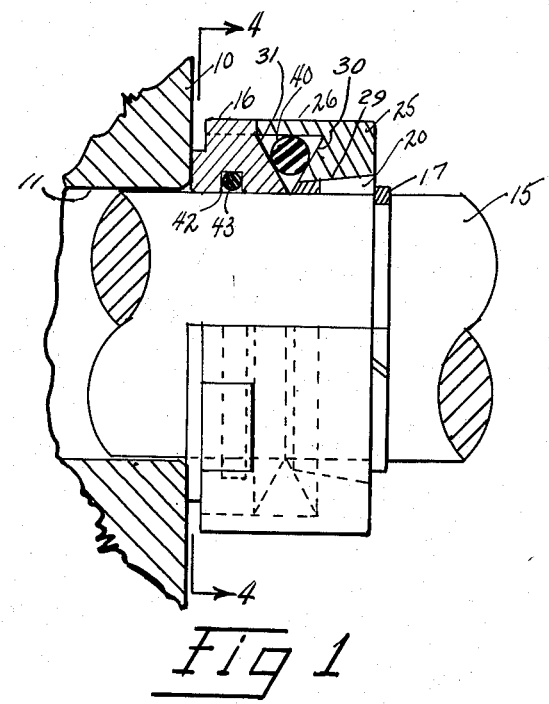

Referring now to Fig. 1 of the drawings, there is shown in section a portion of the fluid-tight housing wall 10 having an opening 11 through which the rotating shaft 15 extends. Loosely supported on the shaft adjacent the housing wall 10 and external thereto is an annular driven member 16 made of bronze or some other suitable bearing material. Axially spaced from the driven bearing member is a split ring 17 which is keyed in a groove on the shaft 15 to act as a limiting stop in a manner to be hereinafter more fully described.

Figure 4:
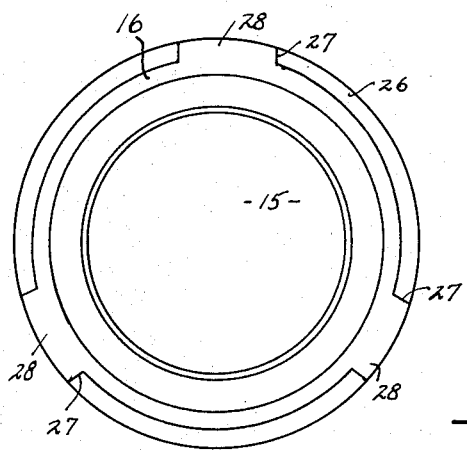
Fig. 4 is an end view along the shaft taken on the lines 4—4 in Fig. 1 of the drawings.
Figures 2, 3:
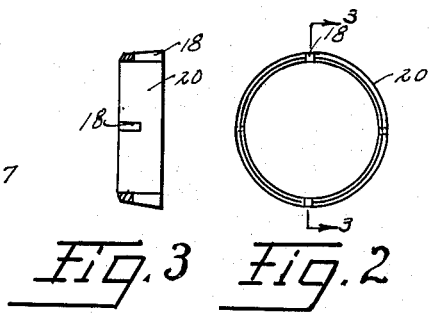
Fig. 2 is an end view of a driving member of the sealing assembly.
Fig. 3 is a view of the driving member taken along the lines 3—3 in Fig. 2.

Intermediate the driven member 16 and the stop ring 17 on the shaft 15 is an annular driving member 20 which is in the form of a sleeve concentrically disposed about the shaft 15 with its inner peripheral surface in intimate contact therewith. The external peripheral surface of the driving sleeve 20 is tapered axially in a manner that rises toward the stop ring 17 to provide an axial wedge surface on the shaft. The driving sleeve 20 is provided with longitudinal axial slots 18 alternating in opposite edges thereof and preferably being greater in length than one-half the axial length of the sleeve. An annular coupling member 25 is concentrically disposed about the driving sleeve 20 and is provided at its outer periphery with an overhanging flange 26 extending axially towards the driven member 16. As best shown in Fig. 4 of the drawings, the overhanging flange 26 is provided with edge recesses or notches 27 which are adapted to interlock with upstanding peripheral lugs 28 on the driven bearing member 16. The inner peripheral surface 29 of the coupling member 25 is tapered axially and complementary with the external tapered surface of the driving ring 20. The adjacent radially extending faces 30 and 31 of the coupling member 25 and the driven member 16 are preferably beveled to provide when assembled on the shaft, an outwardly flaring space therebetween which is closed at its radial extremity by the overhanging flange 26 of the coupling member 25. If desired, only one of the adjacent faces of either the driven member 16 or the coupling member 25, may be beveled at a radial angle varying from 5° to 30° to provide the outwardly flaring space between those members.

A tension means in the form of a resilient ring 40 is freely supported about the shaft in the outwardly flaring space between the driven and coupling members and is adapted to be supported by the opposed beveled surfaces of those members.

In operation, the resilient ring 40 tends to deform laterally against the overhanging flange 26 under the influence of centrifugal force. This tendency coacts in the assembly to separate the driven and coupling members axially along the shaft so as to press the driven member 16 into bearing and sealing contact with the external face of the housing wall 10 and to press the coupling member 25 into wedging relation against the tapered surface of the driving sleeve 20. The wedging action against the external tapered surface of the driving sleeve 20 tends to clamp the slotted sleeve, against the shaft 15 to provide a gripping action therewith. The interlocking flange 26 of the coupling member 25 performs the dual function of causing rotation of the driven and coupling members as a unit under the driving action of the sleeve 20 and also acts as a circumferential abutment against which the resilient ring 40 is deformed to provide the lateral pressure for axially separating the driven and coupling members in the manner aforesaid under the influence of centrifugal force. The sleeve 20 and the toroidal ring 40 coact in the assembly to form a fluid seal along the shaft while the driven member 16 forms a seal at the housing wall.

In the preferred form illustrated in the drawings, the driven member 16 is also provided with an annular groove 42 on its inner peripheral surface in which is disposed a toroidal sealing ring 43 to provide a cumulative seal along the rotating shaft. The coupling and driving members of the sealing assembly are preferably made of hard steel which can be machined with smooth surfaces having good wear qualities.

Figure 5:
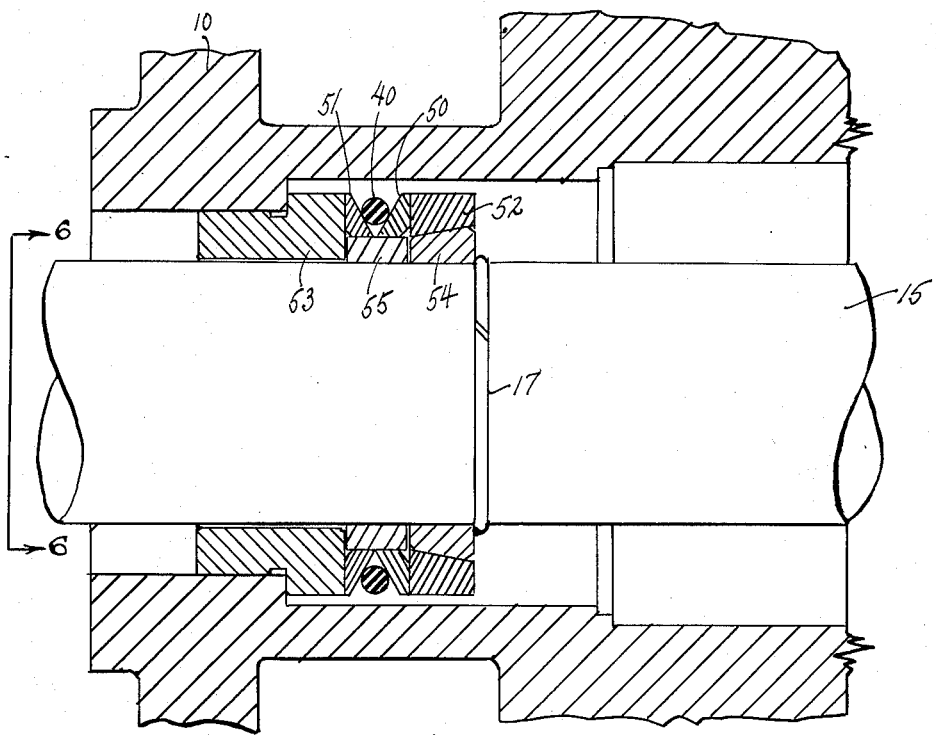
Fig. 5 is a view in partial cross-section of a modified form of sealing assembly for high pressure sealing.
Figure 6:
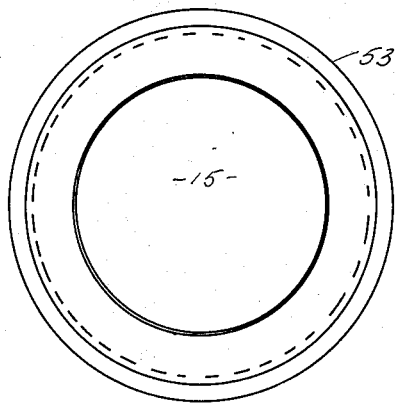
Fig. 6 is an end view of the sealing assembly taken along the lines 6—6 in Fig. 5.
Figure 7:
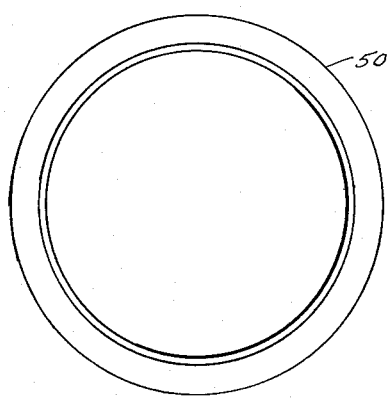
Fig. 7 is an end view in an axial direction of one of the contact bearing members.

Although the hereinbefore described sealing assembly provides an improved sealing performance throughout a wide range of fluid pressures, I have also shown in Figs. 5 to 7 of the drawings a modified form of sealing assembly which, in its preferred form, utilizes additional contact bearing members 50 and 51 that are adapted to support the resilient toroidal ring 40 in radially expanded relation on beveled surfaces. With this arrangement, the contact member 50 coacts as a driven member, under the influence of the contracting tension in the ring 40 which tends to axially separate the contact members against the coupling member 52 and the abutment 53 respectively, the abutment 53 being fixed in the housing by means of a press-fit or the like. The axial separation of the contact members operates to wedge the coupling member 52 on the driving member 54 which clamps against the shaft in the manner hereinbefore described in connection with Figs. 1 to 4 to provide a fluid seal along the shaft and to rotate the sealing assembly.

An additional feature of the modified assembly shown in Figs. 5 to 7 relates to the manner in which the sub-assembly of the ring 40 and the contact members 50 and 51 rotate at a reduced speed relative to the shaft and the driving and coupling members. This results from the fact that the contact member 51 bears against the stationary abutment 53 while the contact member 50 bears against the coupling member 52 which rotates with the driving member at the same speed as the shaft. The contact faces between these numbers are sufficiently smooth to allow slippage, and, under the frictional relationships involved in their coaction, the sub-assembly actually rotates at a lesser speed than the shaft. The reduced speed of this sub-assembly approaches one-half the shaft speed so as to prevent the development of high temperatures at the contact faces.

In the preferred embodiment of this modification as shown in the drawings, there is also provided a spacing member 55 which is in the form of a ring on which the sub-assembly is supported. The ring 55 thus forms part of the sub-assembly and rotates at a reduced speed along with the ring 50 and contact members 50 and 51. The fixed abutment 53 functions to form a seal at the housing wall, while the driving member 54 clamps against the shaft to form a fluid seal in conjunction with the toroidal ring 40 along the shaft.

Thus, I have provided a sealing assembly which coacts between a stationary abutment and a stop on the rotating shaft to continuously maintain a fluid-tight seal along the shaft as well as a bearing and sealing contact between the housing and the shaft throughout a wide range of fluid pressures. The assembly is simple in construction and involves a minimum number of relatively movable parts which may be readily assembled and which minimizes the effect of displacement and wear forces normally resulting from the movement of the rotating shaft.

I have shown and described what I consider to be the preferred embodiment of my invention along with similar modified forms and suggestions and, it will be obvious to those skilled in the art, that other changes and modifications may be made without departing from the scope of my invention as described and defined by the appended claims.

I claim:

1. In a fluid seal for a shaft rotatably extending through a fluid housing wall the combination comprising, a radially flexible annular driving member loosely disposed about the shaft in axial spaced relation from the housing wall and adapted to be clamped against the shaft for rotation therewith, stop means on the shaft for limiting the axial separation of said driving member from the housing wall, a pair of annular sealing members surrounding the shaft intermediate the housing wall and the stop means on the shaft, means coacting between the driving member and the adjacent sealing member in response to an axial force acting against said sealing member to clamp the radially flexible driving member against the shaft, and tension means coacting in compressed relation between said annular sealing members to exert an axial force in opposite directions against the respective sealing members, thereby providing a fluid seal between the shaft and the fluid housing.

2. The fluid seal of claim 1 wherein the annular sealing members each have opposed beveled surfaces on their adjacent faces forming an outwardly open V-shaped seat therebetween and wherein said tension means includes a resilient toroidal ring surrounding the shaft and disposed in radially expanded condition within said V-shaped seat.

3. The fluid seal of claim 1 wherein said clamping means includes mating tapered axial surfaces coacting in wedging relation between the driving member and the adjacent annular sealing member respectively.

4. The fluid seal of claim 1 wherein the annular sealing members each have opposed beveled surfaces on their adjacent faces forming an outwardly open V-shaped seat therebetween and wherein said tension means includes a resilient toroidal ring surrounding the shaft and disposed in radially expanded condition within said V-shaped seat, and wherein said annular sealing members include means for interlocking said members to cause them to rotate together as a unit while permitting axial separation therebetween, said interlocking means having an axial portion overlying said toroidal ring and coacting therewith during rotation of the shaft to laterally deform the body of the ring against the beveled supporting surfaces of the annular sealing members, thereby causing them to separate axially against the housing wall and the clamping means respectively.

5. In a fluid seal for a shaft rotatably extending through a fluid housing wall the combination comprising, a radially flexible sleeve having an axially tapered external surface loosely disposed about the shaft in axial spaced relation from the housing wall and adapted to be clamped against the shaft for rotation therewith, stop means on the shaft for limiting the axial separation of said sleeve from the housing wall, a pair of annular sealing members surrounding the shaft between the housing wall and said stop means, the adjacent annular sealing member having a cooperating portion with a mating axially tapered internal surface loosely surrounding the radially flexible sleeve and adapted to coact in wedging relation therewith in response to an axial force acting against said sealing member to clamp the sleeve against the shaft, and tension means coacting in axially compressed relation between the annular sealing members to exert an axial force in opposite directions against the respective annular members, thereby providing a fluid seal between the shaft and the fluid housing.

6. In a fluid seal for a shaft rotatably extending through a fluid housing wall the combination comprising, a radially flexible sleeve having an axially tapered external surface loosely disposed about the shaft in axial spaced relation from the housing wall and adapted to be clamped against the shaft for rotation therewith, stop means on the shaft for limiting the axial separation of said sleeve from the housing wall, a pair of annular sealing members surrounding the shaft between the housing wall and said sleeve, an annular coupling member freely surrounding said flexible sleeve and having an internal axially tapered mating surface adapted to coact in wedging relation against the external surface of said sleeve in response to an axial force acting thereon to clamp the sleeve against the shaft, each of said annular sealing members having opposed beveled surfaces on their adjacent faces forming an outwardly open V-shaped seat therebetween, and a resilient toroidal ring surrounding the shaft and disposed in radially expanded condition within the V-shaped seat for coaction against the supporting beveled surfaces of the annular sealing members to exert an axial force in opposite directions against the respective sealing members, thereby causing them to separate against the housing wall and the coupling member respectively and provide a fluid seal between the shaft and the fluid housing.

References Cited in the file of this patent

UNITED STATES PATENTS

| 123,413 | Newell | Feb. 6, 1872 |
| 1,967,703 | Bullington | July 24, 1934 |
| 2,200,151 | Burkhardt | May 7, 1940 |
| 2,231,690 | Sheldrick et al. | Feb. 11, 1941 |

FOREIGN PATENTS

| 320,297 | Great Britain | Oct. 10, 1929 |